(12) United States Patent
Kwon et al.

(10) Patent No.: US 11,610,740 B2
(45) Date of Patent: Mar. 21, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Yeong Lim Kwon, Suwon-si (KR); Jung Min Park, Suwon-si (KR); Se Hun Park, Suwon-si (KR); Young Ghyu Ahn, Suwon-si (KR); Soo Hwan Son, Suwon-si (KR); Seung Yong Lee, Suwon-si (KR); Yu Ra Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/370,297

(22) Filed: Jul. 8, 2021

(65) Prior Publication Data

US 2022/0051854 A1   Feb. 17, 2022

(30) Foreign Application Priority Data

Aug. 14, 2020   (KR) .................. 10-2020-0102691
Jan. 4, 2021    (KR) .................. 10-2021-0000553

(51) Int. Cl.
*H01G 4/30*    (2006.01)
*H01G 4/012*   (2006.01)
*H01G 4/224*   (2006.01)
*H01G 4/12*    (2006.01)
*H01G 4/232*   (2006.01)

(52) U.S. Cl.
CPC ............. *H01G 4/30* (2013.01); *H01G 4/012* (2013.01); *H01G 4/1218* (2013.01); *H01G 4/224* (2013.01); *H01G 4/232* (2013.01)

(58) Field of Classification Search
CPC ...................................... H01G 4/224
See application file for complete search history.

(56) References Cited

U.S. PATENT DOCUMENTS

| 10,699,850 B2 | 6/2020 | Lee et al. | |
| 2013/0194715 A1* | 8/2013 | Kim | H01G 4/30 156/60 |
| 2014/0301013 A1* | 10/2014 | Kim | H01G 4/01 29/25.03 |
| 2019/0333699 A1* | 10/2019 | Lee | H01G 4/1281 |
| 2020/0176187 A1* | 6/2020 | Choi | H01G 4/12 |

FOREIGN PATENT DOCUMENTS

| KR | 10-2019-0031928 A | 3/2019 |
| KR | 10-2019-0121226 A | 10/2019 |

* cited by examiner

*Primary Examiner* — Eric W Thomas
(74) *Attorney, Agent, or Firm* — Morgan, Lewis & Bockius LLP

(57) ABSTRACT

A multilayer ceramic electronic component includes a ceramic body including a dielectric layer and first and second internal electrodes with the dielectric layer interposed therebetween, the dielectric layer and the first and second internal electrodes arranged to be stacked, and a first cover portion disposed on the capacitance portion, and a second cover portion disposed on the capacitance portion, a first external electrode connected to the first internal electrode, and a second external electrode connected to the second internal electrode. The first cover portion and the second cover portion include a cover reinforcing layer including graphene.

26 Claims, 4 Drawing Sheets

I-I'

I-I'

MULTILAYER CERAMIC ELECTRONIC COMPONENT

CROSS-REFERENCE TO RELATED APPLICATION(S)

This application claims benefit of priority to Korean Patent Application Nos. 10-2020-0102691 filed on Aug. 14, 2020 and 10-2021-0000553 filed on Jan. 4, 2021 in the Korean Intellectual Property Office, the disclosure of which is incorporated herein by reference in its entirety.

TECHNICAL FIELD

The present disclosure relates to a multilayer ceramic electronic component.

BACKGROUND

While multilayer ceramic capacitors (MLCCs) have increasingly smaller thicknesses and higher capacitance, a thickness of dielectric layers between electrodes has also been reduced due to the thinning of the MLCC and increasing the capacity thereof, so that an allowable voltage per dielectric unit thickness tends to continuously increase. However, not only the dielectric layer but also a thickness of a cover and a margin tend to also decrease to increase an effective volume, which lowers strength of chips. Cracks occurring after mounting or chip breakage due to deformation of a substrate in a mounted state may be due to cracks occurring at the time of chip sintering but those cracks may also come from low strength of a chip itself due to a reduced thickness of the cover and the margin. Therefore, a method for suppressing growth and propagation of cracks in the cover and the margin having a reduced thickness is required.

SUMMARY

Exemplary embodiments provide a multilayer ceramic electronic component having improved mechanical strength.

Exemplary embodiments provide a multilayer ceramic electronic component in which an occurrence of cracks is suppressed.

Exemplary embodiments provide a multilayer ceramic electronic component in which a growth of formed cracks is suppressed.

According to an aspect of the present disclosure, a multilayer ceramic electronic component includes: a ceramic body including a dielectric layer and first and second internal electrodes disposed to face each other with the dielectric layer interposed therebetween; a first external electrode connected to the first internal electrode; and a second external electrode connected to the second internal electrode. The ceramic body includes first and second surfaces opposing each other in a first direction, third and fourth surfaces opposing each other in a second direction, and fifth and sixth surfaces opposing each other in a third direction and includes a capacitance portion including the first and second internal electrodes stacked in the third direction to form capacitance, a first cover portion disposed on the fifth surface, and a second cover portion disposed on the sixth surface. The first cover portion and/or the second cover portion include a cover reinforcing layer including graphene, and an average thickness of the cover reinforcing layer is 5% or more of an average thickness of the first cover portion or the second cover portion.

According to an aspect of the present disclosure, a multilayer ceramic electronic component includes: a ceramic body including a dielectric layer and first and second internal electrodes disposed to face each other with the dielectric layer interposed therebetween; a first external electrode connected to the first internal electrode; and a second external electrode connected to the second internal electrode. The ceramic body includes first and second surfaces opposing each other in a first direction, third and fourth surfaces opposing each other in a second direction, and fifth and sixth surfaces opposing each other in a third direction and includes a capacitance portion including the first and second internal electrodes stacked in the third direction to form capacitance, a first margin portion disposed on the third surface, and a second margin portion disposed on the fourth surface. The first margin portion and/or the second margin portion include a margin reinforcing layer including graphene, and an average thickness of the margin reinforcing layer is 5% or more of an average thickness of the first margin portion or the second margin portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
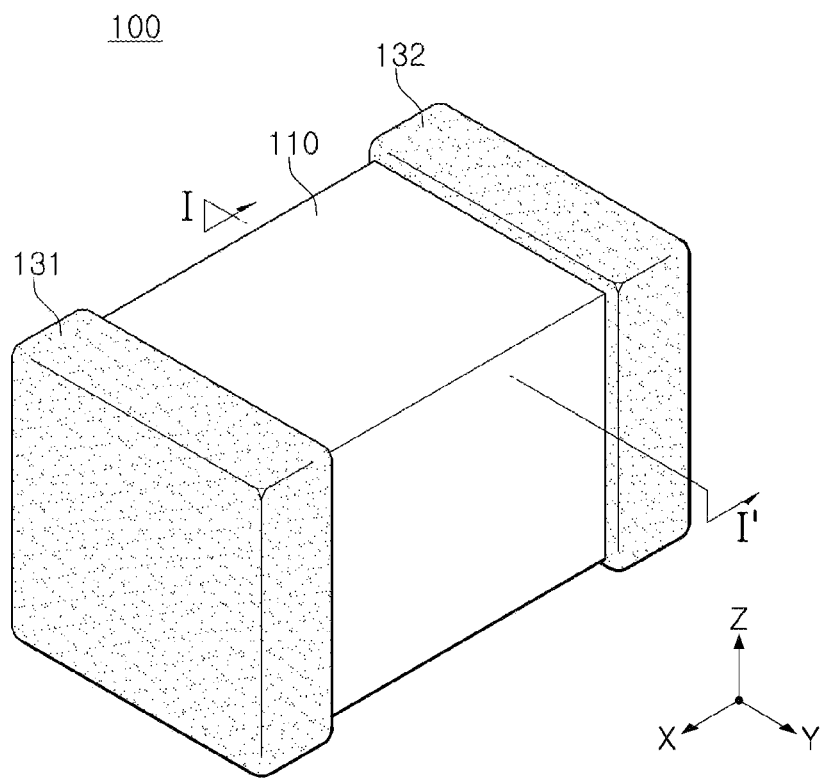
FIG. 1 is a perspective view schematically illustrating a multilayer electronic component according to an exemplary embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or exemplary embodiment, e.g., as to what an example or exemplary embodiment may include or implement, means that at least an example or exemplary embodiment exists in which such a feature is included or implemented while all examples and exemplary embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, any such members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depictions of elements in the drawings may be exaggerated for clarity, illustration, and convenience.

In this disclosure, an X direction may be defined as a first direction, an L direction, or a length direction, a Y direction may be defined as a second direction, a W direction, or a width direction, and a Z direction may be defined as a third direction, a T direction, or a thickness direction.

Figure 2:
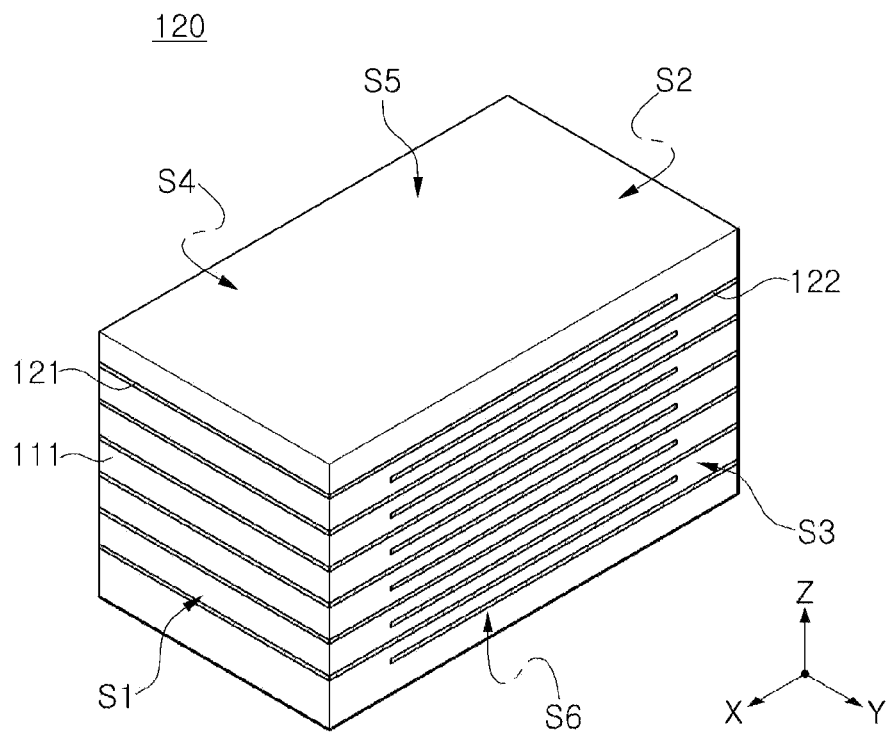
FIG. 2 is a perspective view schematically illustrating a capacitance portion of a multilayer ceramic electronic component according to an exemplary embodiment in the present disclosure.
Figure 3A:
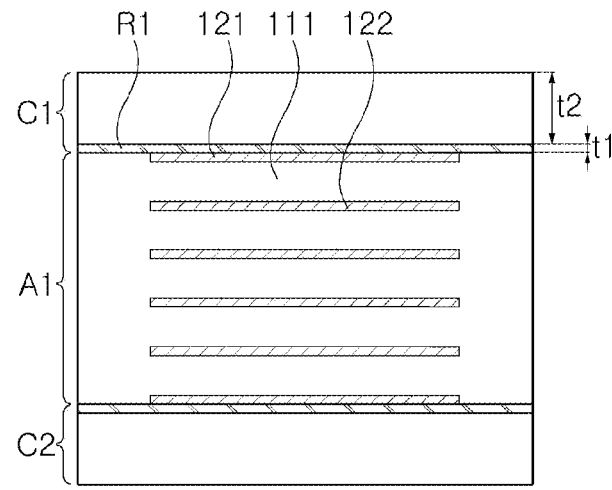
FIG. 3A is a cross-sectional view schematically illustrating an example in which a cover reinforcing layer is disposed on an innermost side of a cover portion.
Figure 3B:
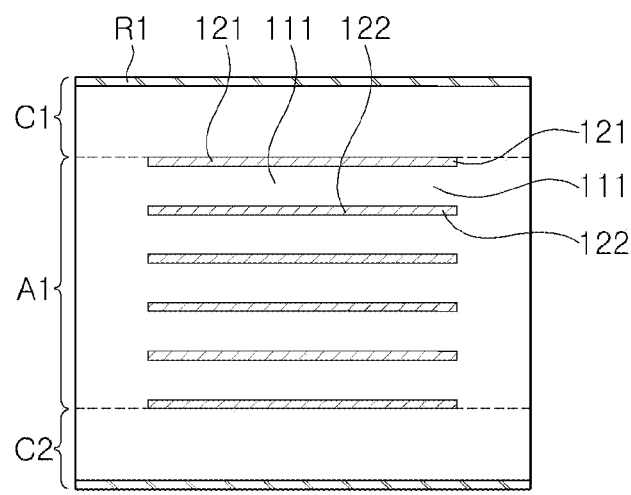
FIG. 3B is a cross-sectional view schematically illustrating an example in which a cover reinforcing layer is disposed on an outermost side of a cover portion.
Figure 3C:
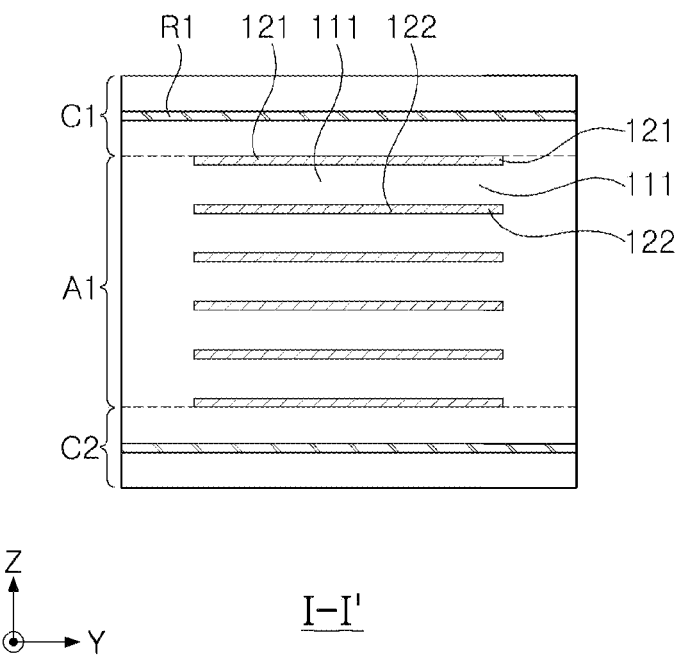
FIG. 3C is a cross-sectional view schematically illustrating an example in which a cover reinforcing layer is disposed inside a cover portion.
Figure 4A:
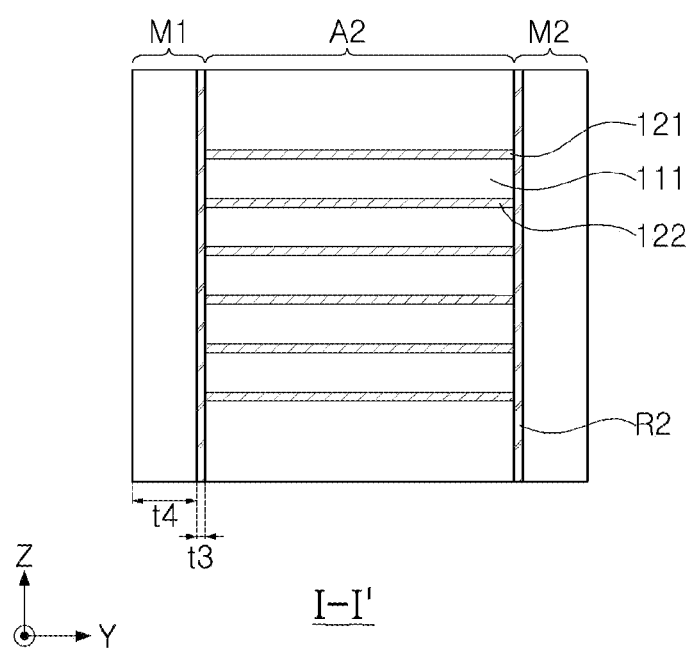
FIG. 4A is a cross-sectional view schematically illustrating an example in which a margin reinforcing layer is disposed on an innermost side of a margin portion.
Figure 4B:
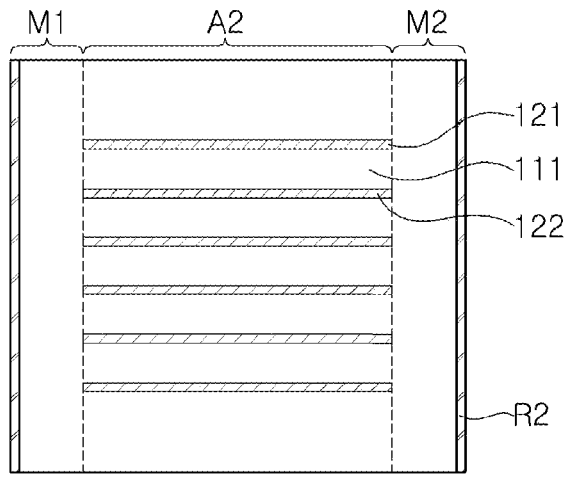
FIG. 4B is a cross-sectional view schematically illustrating an example in which a margin reinforcing layer is disposed on an outermost side of a margin portion.
Figure 4C:
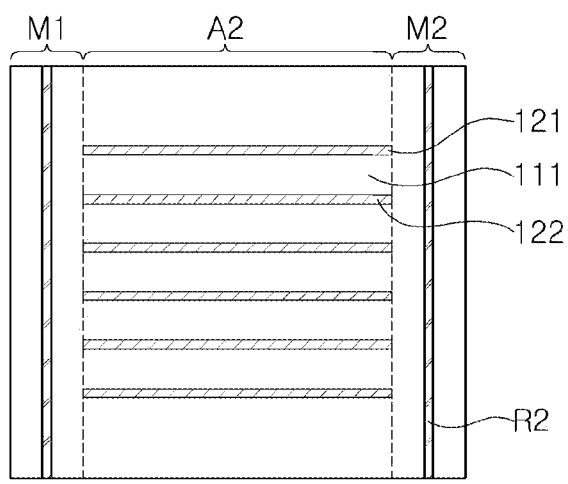
FIG. 4C is a cross-sectional view schematically illustrating an example in which a margin reinforcing layer is disposed inside a margin portion.

FIG. 1 is a perspective view schematically illustrating a multilayer electronic component according to an exemplary embodiment in the present disclosure. FIG. 2 is a perspective view schematically illustrating a capacitance portion of a multilayer ceramic electronic component according to an exemplary embodiment in the present disclosure. FIG. 3A is a cross-sectional view schematically illustrating an example in which a cover reinforcing layer is disposed on an innermost side of a cover portion. FIG. 3B is a cross-sectional view schematically illustrating an example in which a cover reinforcing layer is disposed on an outermost side of a cover portion. FIG. 3C is a cross-sectional view schematically illustrating an example in which a cover reinforcing layer is disposed inside a cover portion. FIG. 4A is a cross-sectional view schematically illustrating an example in which a margin reinforcing layer is disposed on an innermost side of a margin portion. FIG. 4B is a cross-sectional view schematically illustrating an example in which a margin reinforcing layer is disposed on an outermost side of a margin portion. FIG. 4C is a cross-sectional view schematically illustrating an example in which a margin reinforcing layer is disposed inside a margin portion.

Referring to drawings, a multilayer ceramic electronic component 100 according to the present disclosure includes a ceramic body 110 including a dielectric layer 111 and a first internal electrode 121 and a second internal electrode 122 disposed to face each other with the dielectric layer 111 therebetween; a first external electrode 131 connected to the first internal electrode 121; and a second external electrode 132 connected to the second internal electrode 122. The ceramic body 110 may include first and second surfaces S1 and S2 facing each other in the first direction, third and fourth surfaces S3 and S4 facing each other in the second direction, and fifth and sixth surfaces S5 and S6 facing each other in the third direction, and may include a capacitance portion forming capacitance A1 including the first internal electrode 121 and the second internal electrode 122 stacked in the third direction.

In an exemplary embodiment in the present disclosure, the multilayer ceramic electronic component may include a first cover portion C1 disposed on a surface of the capacitance portion A1 of the ceramic body 110 in the third direction and providing the fifth surface S5 of the ceramic body 110, and a second cover portion C2 disposed on another surface of the capacitance portion A1 in the third direction and providing the fifth surface S6 of the ceramic body 110, and the first cover portion C1 and/or the second cover portion C2 may include a cover reinforcing layer R1 including graphene.

In the present disclosure, "graphene" may refer to a material forming an arrangement in which carbon atoms are connected in a two-dimensional hexagonal shape sp2 bonds and having a thickness corresponding to a single carbon atom layer, and may refer to material having a structure in which carbon atoms, exfoliated from graphite having a three-dimensional structure as an allotrope, are connected to each other in a hexagonal honeycomb shape to form a two-dimensional planar structure.

In the multilayer ceramic electronic component 100 of the present disclosure according to an exemplary embodiment, the cover portion C1/C2 may include a cover reinforcing layer R1 to improve mechanical strength of the multilayer ceramic electronic component 100. The cover reinforcing layer R1 may prevent an occurrence of cracking in the multilayer ceramic electronic component. In addition, the cover reinforcing layer R1 may include graphene to improve both compressive strength and tensile strength of the cover reinforcing layer, and may suppress propagation of cracking that has already occurred to other regions.

In the above exemplary embodiment, an average thickness t1 of the cover reinforcing layer R1 may be 5% or more of an average thickness t2 of the first cover portion C1 or the second cover portion C2. In the present disclosure, a "thickness" of the cover portion C1/C2 and/or the cover reinforcing layer R1 may refer to a thickness of the cover portion C1/C2 and/or the cover reinforcing layer R1 measured in a direction perpendicular to a surface of the cover portion C1/C2 and/or the cover reinforcing layer R1. The "average thickness" may be a value measured with respect to any one of the first cover portion C1 and the second cover portion C2 in an X-Z cut plane (or a Y-Z cut plane) passing through the center of the multilayer ceramic electronic component and with respect to the reinforcing layer R1 disposed in the outermost position in the third direction, and may refer to an arithmetic average of thicknesses measured at ten locations of the cover portion C1/C2 and/or the cover reinforcing layer R1 at equal intervals in the first direction (or the second direction if a Y-Z cut plane). An average thickness may be measured by, for example, a scanning electron microscope (SEM) or an optical microscope, although the measurement method or tool is not limited thereto. Other methods and/or tools appreciated by one of ordinary skill in the art, even if not described in the present disclosure, may also be used.

That the average thickness t1 of the cover reinforcing layer R1 is 5% or more of the average thickness of the first cover portion C1 or the second cover portion C2 means that the average thickness t1 of the cover reinforcing layer R1 is 0.05 or more times the average thickness t2 of the first cover portion C1 or the second cover portion C2. If the average thickness t1 of the cover reinforcing layer R1 is less than 5% of the average thickness t2 of the first cover portion C1 or the second cover portion C2, the effect of improving strength with the reinforcing layer R1 inside the cover may not be sufficiently obtained.

In an example, the average thickness t1 of the cover reinforcing layer R1 included in the first cover portion C1 and/or the second cover portion C1 may be 50% or less of the average thickness t2 of the first cover portion C1 or the second cover portion C2. Since the average thickness t2 of the cover portion C1/C2 and the average thickness t1 of the cover reinforcing layer R1 is the same as described above, a description thereof will be omitted. If the average thickness t1 of the cover reinforcing layer R1 exceeds 50% of the average thickness t2 of the cover portion C1/C2, mechanical strength may be deteriorated due to a difference in shrinkage behavior between the cover reinforcing layer R1 and the remaining portion of the cover portion C1/C2 during a sintering process.

In another exemplary embodiment in the present disclosure, the multilayer ceramic electronic component may include a first margin portion M1 disposed on a surface of the capacitance portion A1 of the ceramic body 110 in the second direction and providing the third surface S3 of the ceramic body 110 and a second margin portion M2 disposed on another surface of the capacitance portion A1 in the second direction and providing the fourth surface S4 of the ceramic body 110, and the first margin portion M1 and/or the second margin portion M2 may include a margin reinforcing layer R2 including graphene. In the above exemplary embodiment, an average thickness of the margin reinforcing layer R2 may be 5% or more of an average thickness of the first margin portion M1 or the second margin portion M2.

In the above exemplary embodiment, an average thickness t3 of the margin reinforcing layer R2 may be 5% or more of an average thickness t4 of the first margin portion M1 or the second margin portion M2. In the present disclosure, a "thickness" of the margin portion M1/M2 and/or the margin reinforcing layer R2 may refer to a thickness of the margin portion M1/M2 and/or the margin reinforcing layer R2 measured in a direction perpendicular to a surface of the margin portion M1/M2 and/or the margin reinforcing layer R2. The "average thickness" may be a value measured with respect to any one of the first margin portion M1 and the second margin portion M2 in a X-Z cut plane (or a Y-Z cut plane) passing through the center of the multilayer ceramic electronic component and with respect to the reinforcing layer R2 disposed in the outermost position in the second direction, and may refer to an arithmetic average of thicknesses measured at ten locations of the margin portion M1/M2 and/or the margin reinforcing layer R2 at equal intervals in the third direction (or the second direction).

That the average thickness t3 of the margin reinforcing layer R2 is 5% or more of the average thickness of the first margin portion M1 or the second margin portion M2 means that the average thickness t3 of the margin reinforcing layer R2 is 0.05 or more times the average thickness of the first margin portion M1 or the second margin portion M2. If the average thickness t3 of the margin reinforcing layer R2 is less than 5% of the average thickness t4 of the first margin portion M1 or the second margin portion M2, the effect of improving strength with the reinforcing layer inside the margin may not be sufficiently obtained.

In an example, the average thickness t3 of the margin reinforcing layer R2 included in the first margin portion M1 and/or the second margin portion M2 may be 50% or less of the average thickness t4 of the first margin portion M1 or the second margin portion M2. Since the average thickness t4 of the margin portion M1/M2 and the average thickness t3 of the margin reinforcing layer R2 is the same as described above, a description thereof will be omitted. If the average thickness t3 of the margin reinforcing layer R2 exceeds 50% of the average thickness t4 of the margin portion M1/M2, mechanical strength may be deteriorated due to a difference in shrinkage behavior between the margin reinforcing layer and the margin portion during a sintering process.

In an example, the multilayer ceramic electronic component of the present disclosure may include the aforementioned cover reinforcing layer R1 and the margin reinforcing layer R2 together. Since the cover reinforcing layer R1 and the margin reinforcing layer R2 are the same as described above, a description thereof will be omitted.

The ceramic body 110 of the multilayer ceramic electronic component 100 according to the present disclosure may include a capacitance portion A1.

There is no particular limitation on a specific shape of the capacitance portion A1, and the capacitance portion A1 may have a hexahedral shape or a similar shape as shown. Due to shrinkage of ceramic powder particles included in the capacitance portion during sintering, the capacitance portion A1 may have a substantially hexahedral shape, the capacitance portion A1 may not have a hexahedral shape with perfectly straight lines but may have a substantially hexahedral shape. If necessary, the capacitance portion A1 may be rounded so that the corners are not angled. The rounding may use, for example, barrel polishing, but is not limited thereto.

In the capacitance portion of the multilayer ceramic electronic component according to the present disclosure, a dielectric layer 111, a first internal electrode 121, and a second internal electrode 122 may be alternately stacked. The dielectric layer 111, the first internal electrode 121, and the second internal electrode 122 may be stacked in a third direction (Z direction). The plurality of dielectric layers 111 forming the capacitance portion are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient electrostatic capacitance may be obtained. For example, a barium titanate-based material, a lead composite perovskite-based material, or a strontium titanate-based material may be used or a component represented by $(Ba_{1-x}Ca_x)(Ti_{1-y}(Zr, Sn, Hf)_y)O_3$ ($0 \leq x \leq 1$, $0 \leq y \leq 0.5$) may be used. As a material for forming the dielectric layer 111, various ceramic additives, organic solvents, plasticizers, binders, dispersants, etc. may be added to the powder particle such as barium titanate ($BaTiO_3$) or the like according to purposes of the present disclosure.

In an exemplary embodiment in the present disclosure, the dielectric layer of the capacitance portion of the multilayer ceramic electronic component of the present disclosure may include a grain and a grain boundary. The dielectric layer of the capacitance portion may include a plurality of grains and grain boundaries disposed between two or more grains. The grains may be distinguished by the grain boundaries.

The dielectric layer 111 may be formed by adding an additive as necessary to a slurry containing the aforementioned material, applying the slurry onto a carrier film, and drying the slurry to prepare a plurality of ceramic sheets. The ceramic sheet may be formed by manufacturing the slurry into a sheet type having a thickness of several μm by a doctor blade method, but is not limited thereto.

In an example, an average thickness of the dielectric layer 111 may be 0.4 um or less. The average thickness of the dielectric layer 111 may be an average of values measured at five different locations of the fired dielectric layer 111. A lower limit of the average thickness of the dielectric layer 111 is not particularly limited, but may be, for example, 0.01 um or more.

The first and second internal electrodes 121 and 122 may be stacked so that their respective cross-sections are exposed to opposing ends of the capacitance portion. For example, the cross-sections of the first and second internal electrodes 121 and 122 may extend from, be connected to, and/or be in contact with the opposing ends of the capacitance portion, respectively. Specifically, the first and second internal electrodes 121 and 122 may be exposed to, be connected to, extend from, and/or be in contact with both surfaces of the capacitance portion in the first direction (X direction), respectively. The first internal electrode 121 may be exposed to, be connected to, extend from, and/or be in contact with the first surface S1 of the capacitance portion. The second internal electrode 122 may be exposed to, be connected to, extend from, and/or be in contact with a second surface S2.

A material forming the first and second internal electrodes 121 and 122 is not particularly limited. For example, the first and second internal electrodes 121 and 122 may be formed using a conductive paste including at least one of silver (Ag), palladium (Pd), gold (Au), platinum (Pt), nickel (Ni), copper (Cu), tin (Sn), tungsten (W), titanium (Ti), and alloys thereof.

The capacitance portion A1 may be formed by alternately stacking a ceramic green sheet on which the first internal electrode 121 is printed on the dielectric layer 111 and a ceramic green sheet on which the second internal electrode 122 is printed on the dielectric layer 111 in a third direction (Z direction). The first and second internal electrodes 121 and 122 may be printed using a screen-printing method or a gravure printing method, but is not limited thereto.

An average thickness of the first and second internal electrodes 121 and 122 may be 0.4 um or less. The average thickness of the internal electrodes may be an average of values measured at five different locations of fired internal electrodes. A lower limit of the average thickness of the first and second internal electrodes is not particularly limited, but may be, for example, 0.01 um or more.

In an exemplary embodiment in the present disclosure, the multilayer ceramic electronic component according to the present disclosure may include a first cover portion C1 and a second cover portion C2. The first cover portion C1 and the second cover portion C2 may be disposed on both surfaces of the capacitance portion A1 in the third direction. Specifically, the first cover portion C1 may be disposed on the fifth surface of the capacitance portion A1, and the second cover portion C2 may be disposed on the sixth surface of the capacitance portion A1.

Here, the first and second cover portions C1 and C2 may include the same component as the dielectric layer, and may be formed by stacking at least one dielectric layer not including an internal electrode on both surfaces of the capacitance portion in the third direction. The first and second cover portions may basically serve to prevent damage to the internal electrodes due to physical or chemical stress.

The first and second cover portions C1 and C2 may include a plurality of grains and grain boundaries disposed between adjacent grains. The cover portion may include the same ceramic material and graphene as the dielectric layer, and may be formed of the same material as the dielectric layer. The same ceramic material as the dielectric layer may include a plurality of grains and grain boundaries disposed between two or more grains, similar to the aforementioned dielectric layer.

In an example of the present disclosure, an average particle diameter of the grains of the first cover portion C1 and/or the second cover portion C2 of the multilayer ceramic electronic component 100 of the present disclosure may be smaller than an average particle diameter of the grains included in the dielectric layer 111 of the capacitance portion described above. In the present disclosure, the "average particle diameter" may refer to an arithmetic average of particle diameters measured at ten locations of a cut plane passing through the center of the multilayer ceramic electronic component 100. The ten locations of the dielectric layer may be 10 locations at equal intervals in the first direction along the center of the dielectric layer closest to the center of the X-Y cut plane of the multilayer ceramic electronic component. Also, the ten locations of the cover portion may be 10 locations at equal intervals in the first direction along the center of the first cover portion and/or the second cover portion in the X-Y cut plane passing through the center of the multilayer ceramic electronic component. The average particle diameter may refer to a D50 particle diameter. The measured particle diameter of the grains may be calculated through an image analysis program (Mediacybernetics' Image Pro Plus ver 4.5) after capturing an image of a cut plane of the dielectric layer 111 and the cover portions C1 and C2 using a scanning electron microscope (SEM) (Jeol's JSM-7400F). Other methods and/or tools appreciated by one of ordinary skill in the art, even if not described in the present disclosure, may also be used.

A maximum thickness of the first and second cover portions C1 and C2 may be, for example, 50 μm or less. A lower limit of the maximum thickness of the first and second cover portions C1 and C2 is not particularly limited, but may be, for example, 0.1 μm or more.

In the multilayer ceramic electronic component according to an exemplary embodiment in the present disclosure, the first and second cover portions C1 and C2 may include a cover reinforcing layer R1. The cover reinforcing layer R1 may include an insulating material and graphene and may be formed of a ceramic material such as barium titanate. In this case, the cover reinforcing layer R1 may include the same ceramic material as that included in the dielectric layer 111 or may be formed of the same material as the dielectric layer 111. The same ceramic material as that of the dielectric layer 111 may include a plurality of grains and grain boundaries disposed between two or more grains, similar to the aforementioned dielectric layer. In this case, graphene included in the cover reinforcing layer R1 may be located at the grain boundaries. Graphene may be discontinuously dispersed in the grain boundaries.

The graphene may be one or more selected from the group consisting of graphene, high-quality graphene (HQG), graphene oxide (GO), and reduced graphene oxide (RGO), and the high-quality graphene may refer to graphene in which formation of domain boundaries is inhibited.

In an example, graphene included in the cover reinforcing layer may be included in a ratio of 0.001 w % to 50 w % based on a weight of a ceramic material such as barium titanate included in the cover reinforcing layer R1. This value may be a value measured for the reinforcing layer disposed in the outermost position in the third direction in the X-Z cut plane passing through the center of the multilayer ceramic electronic component and may be a value for the reinforcing layer measured by pulverizing 10 equally spaced samples in the first direction and oxidizing the same under an oxygen atmosphere.

In addition, the content of graphene included in the reinforcing layer R1 may be 10 ppm or more and 200,000 ppm or less based on 50 nm-sized grains in the dielectric layer 111.

In an exemplary embodiment in the present disclosure, the reinforcing layer R1 of the multilayer ceramic electronic component of the present disclosure may have a D peak, which is distinguished from a G peak, in a Raman spectrum. The Raman spectrum may be a value measured using a Raman spectrometer LabRam HR-800 manufactured by HORIBA Co., Ltd. in Japan. The presence or absence of graphene may be determined and distinction thereof from other carbon allotropes may be made by the Raman spectrum, and in the grain boundaries of the multilayer capacitor according to another aspect of the present disclosure, a peak is detected in a D band and a G band when Raman analysis is performed. However, a shape and strength of a 2D band may be different depending on an applied graphene group. Other methods and/or tools appreciated by one of ordinary skill in the art, even if not described in the present disclosure, may also be used.

In an exemplary embodiment in the present disclosure, the cover reinforcing layer R1 included in the cover portion C1/C2 may have a plate-like shape. The cover reinforcing layer R1 may be formed from a ceramic sheet prepared by applying and drying a slurry including a dielectric material and graphene on a carrier film.

In an exemplary embodiment in the present disclosure, the cover reinforcing layer R1 may be disposed on the innermost side of the cover portion C1/C2, as shown in FIG. 3A. When the cover reinforcing layer R1 is disposed on the innermost side of the cover portion, it may mean that the cover reinforcing layer R1 is disposed to contact the capacitance portion A1. In this case, the cover reinforcing layer R1 of the upper cover portion C1 may be located at the bottom of the upper cover portion C1, and the cover reinforcing layer R1 of the lower cover portion C2 may be located at the top of the lower cover portion C2.

In another exemplary embodiment in the present disclosure, the cover reinforcing layer R1 may be disposed on the outermost side of the cover portion C1/C2, as shown in FIG. 3B. When the cover reinforcing layer R1 is disposed on the outermost side of the cover portion C1/C2, it may mean that the cover reinforcing layer R1 is disposed to be exposed to, be connected to, extend from, or be in contact with an outer surface of the ceramic body, or is provided as at least a portion of the outer surface of the ceramic body. In this case, the cover reinforcing layer R1 of the upper cover portion C1 may be located at the top of the upper cover portion C1, and the cover reinforcing layer R1 of the lower cover portion C2 may be located at the bottom of the lower cover portion C2.

In an example, the cover reinforcing layer R1 may be disposed inside the cover portion, as shown in FIG. 3C. When the cover reinforcing layer R1 is disposed inside the cover portion C1/C2, it may mean that the cover reinforcing layer R1 is disposed in a space between an interface between the capacitance portion R1 and the cover portion C1/C2 and the outer surface of the ceramic body and may mean that the cover reinforcing layer R1 is disposed to be spaced apart from the capacitance portion A1 and the outer surface of the ceramic body in the third direction.

According to an exemplary embodiment in the present disclosure, a maximum thickness of the cover reinforcing layer R1 may be within a range of 0.1 μm or more and 50 μm or less. The maximum thickness of the cover reinforcing layer R1 may be a value measured for the reinforcing layer disposed in the outermost position of the X-Z cut plane passing through the center of the multilayer ceramic electronic component in the third direction, and may refer to a maximum value of a thickness of the reinforcing layer in the outermost position.

In an example, in the multilayer ceramic electronic component according to the present disclosure, a plurality of reinforcing layers R1 may be disposed in one cover portion C1/C2. When a plurality of reinforcing layers are disposed in one cover portion, it may mean that two or more reinforcing layers R1 distinguished from the cover portion C1/C2 are disposed in the cover portion C1/C2. There may be two or more reinforcing layers R1 included in one cover portion C1/C2, and for example, there may be 50 or less.

According to another exemplary embodiment in the present disclosure, a multilayer ceramic electronic component of the present disclosure may include a ceramic body including a capacitance portion A1 including a dielectric layer 111 and first and second internal electrodes 121 and 122 disposed and stacked to face each other with the dielectric layer 111 interposed therebetween in a third direction and including first and second surfaces S1 and S2 facing each other in a first direction (X direction), third and fourth surfaces S3 and S4 facing each other in a second direction (Y direction), and fifth and sixth surfaces S5 and S6 facing each other in a third direction (Z direction), and a first margin portion M1 disposed on the third surface S3 of the capacitance portion and a second margin portion M2 disposed on the fourth surface S4 of the capacitance portion; a first external electrode 131 connected to the first internal electrode 121; and a second external electrode 132 connected to the second internal electrode 122.

In this case, the first margin portion M1 and the second margin portion M2 may include a margin reinforcing layer R2 including graphene. In the multilayer ceramic electronic component of the present disclosure according to an exemplary embodiment in the present disclosure, the margin portion M1/M2 may include a margin reinforcing layer R2 to improve mechanical strength of the multilayer ceramic electronic component. The reinforcing layer may prevent cracks from occurring in the multilayer ceramic electronic component. In addition, the reinforcing layer may include graphene to improve both compressive strength and tensile strength of the reinforcing layer and may inhibit propagation of cracks that have already occurred to other regions.

In an exemplary embodiment in the present disclosure, the multilayer ceramic electronic component according to the present disclosure may include a first margin portion M1 and a second margin portion M2. The first margin portion M1 and the second margin portion M2 may be disposed on both surfaces of the capacitance portion A1 in the second direction. Specifically, the first margin portion M1 may be disposed on the third surface of the capacitance portion A1, and the second margin portion M2 may be disposed on the fourth surface of the capacitance portion A1.

In this case, the first and second margin portions M1 and M2 may include the same component as the dielectric layer 111 and may be formed by stacking at least one dielectric layer not including an internal electrode on both sides of the capacitance portion A1 in the second direction, respectively.

The first and second margin portions M1 and M2 may include a plurality of grains and grain boundaries disposed between adjacent grains. The margin portion M1/M2 may include the same ceramic material and graphene as the dielectric layer, and may be formed of the same material as the dielectric layer. The same ceramic material as the dielectric layer may include a plurality of grains and grain boundaries disposed between two or more grains, similar to the aforementioned dielectric layer.

In an example of the present disclosure, an average particle diameter of the grains of the first margin portion M1 and/or the second margin portion M2 of the multilayer ceramic electronic component 100 of the present disclosure may be smaller than an average particle diameter of the grains included in the dielectric layer 111 of the capacitance portion described above. In the present disclosure, the "average particle diameter" may refer to an arithmetic average of particle diameters measured at ten locations of a cut plane of the multilayer ceramic electronic component 100. The ten locations of the dielectric layer may be 10 locations at equal intervals in the first direction along the center of the dielectric layer closest to the center of the X-Y cut plane passing through the center of the multilayer ceramic electronic component. Also, the ten locations of the margin portion may be 10 locations at equal intervals in the third direction along the center of the first margin portion and/or the second margin portion in the Y-Z cut plane passing through the center of the multilayer ceramic electronic component. The average particle diameter may refer to a D50 particle diameter. The measured particle diameter of the grains may be calculated through an image analysis program (Mediacybernetics' Image Pro Plus ver 4.5) after capturing an image of a cut plane of the dielectric layer 111/cover portion using a scanning electron microscope (SEM) (Jeol's JSM-7400F). Other methods and/or tools appreciated by one of ordinary skill in the art, even if not described in the present disclosure, may also be used.

A maximum thickness of the first and second margin portions M1 and M2 may be, for example, 50 μm or less. A lower limit of the maximum thickness of the first and second margin portions M1 and M2 is not particularly limited, but may be, for example, 0.1 μm or more.

In the multilayer ceramic electronic component according to an exemplary embodiment in the present disclosure, the first and second margin portions M1 and M2 may include a margin reinforcing layer R2. The margin reinforcing layer R2 may include an insulating material and graphene and may be formed of a ceramic material such as barium titanate. In this case, the margin reinforcing layer R2 may include the same ceramic material as that included in the dielectric layer or may be formed of the same material as the dielectric layer. The same ceramic material as the dielectric layer may include a plurality of grains and grain boundaries disposed between two or more grains, similar to the aforementioned dielectric layer. In this case, graphene included in the margin reinforcing layer R2 may be located at the grain boundaries. Graphene may be discontinuously dispersed in the grain boundaries.

The graphene may be one or more selected from the group consisting of graphene, high-quality graphene (HQG), graphene oxide (GO), and reduced graphene oxide (RGO), and the high-quality graphene may refer to graphene in which formation of domain boundaries is inhibited.

In an example, graphene included in the margin reinforcing layer R2 may be included in a ratio of 0.001 w % to 50 w % based on a weight of a ceramic material such as barium titanate included in the cover reinforcing layer. This value may be a value measured for the reinforcing layer disposed in the outermost position in the second direction in the Y-Z cut plane passing through the center of the multilayer ceramic electronic component and may be a value for the reinforcing layer measured by pulverizing 10 equally spaced samples in the third direction and oxidizing the same under an oxygen atmosphere.

In addition, the content of graphene included in the margin reinforcing layer R2 may be 10 ppm or more and 200,000 ppm or less based on 50 nm-sized grains in the dielectric layer.

In an exemplary embodiment in the present disclosure, the reinforcing layer R2 of the multilayer ceramic electronic component of the present disclosure may have a D peak, which is distinguished from a G peak, in a Raman spectrum. The Raman spectrum may be a value measured using a Raman spectrometer LabRam HR-800 manufactured by HORIBA Co., Ltd. in Japan. The presence or absence of graphene may be determined and distinction thereof from other carbon allotropes may be made by the Raman spectrum, and in the grain boundaries of the multilayer capacitor according to another aspect of the present disclosure, a peak is detected in a D band and a G band when Raman analysis is performed. However, a shape and strength of a 2D band may be different depending on an applied graphene group. Other methods and/or tools appreciated by one of ordinary skill in the art, even if not described in the present disclosure, may also be used.

In an exemplary embodiment in the present disclosure, the margin reinforcing layer included in the margin portion may have a plate-like shape. The margin reinforcing layer may be formed from a ceramic sheet prepared by applying and drying a slurry including a dielectric material and graphene on a carrier film.

In an exemplary embodiment in the present disclosure, the margin reinforcing layer may be disposed on the innermost side of the margin portion M1/M2, as shown in FIG. 4A. When the margin reinforcing layer R2 is disposed on the innermost side of the margin portion M1/M2, it may mean that the margin reinforcing layer R2 is disposed to be in contact with the capacitance portion A1. In this case, the margin reinforcing layer R2 of the margin portion M1/M2 may be disposed to be in contact with the third and fourth surfaces of the capacitance portion A1.

In another exemplary embodiment in the present disclosure, the margin reinforcing layer R2 may be disposed on the outermost side of the margin portion M1/M2, as shown in FIG. 4B. When the margin reinforcing layer R2 is disposed on the outermost side of the margin portion M1/M2, it may mean that the margin reinforcing layer M1/M2 is disposed to be exposed to, be connected to, extend from, or be in contact with the outer surface of the ceramic body, or is provided as at least a portion of the outer surface of the ceramic body. In this case, the margin reinforcing layer R2 may be disposed to be exposed to, be connected to, extend from, or be in contact with both surfaces of the ceramic body in the second direction.

In an example, the margin reinforcing layer R2 may be disposed inside the margin portion M1/M2, as shown in FIG. 4C. When the margin reinforcing layer R2 is disposed inside the margin portion M1/M2, it may mean that the margin reinforcing layer R1 is disposed in a space between an interface between the capacitance portion A1 and the margin portion M1/M2 and the outer surface of the ceramic body and is disposed to be spaced apart from the capacitance portion and the outer surface of the ceramic body in the second direction.

According to an exemplary embodiment in the present disclosure, a maximum thickness of the margin reinforcing layer R2 may be within a range of 0.1 μm or more and 50 μm or less. The maximum thickness of the margin reinforcing layer R2 may be a value measured for the reinforcing layer R2 disposed in the outermost position of the Y-Z cut plane passing through the center of the multilayer ceramic electronic component in the second direction, and may refer to a maximum value of a thickness of the reinforcing layer in the outermost position.

In an example, in the multilayer ceramic electronic component according to the present disclosure, a plurality of margin reinforcing layers R2 may be disposed in one margin portion M1/M2. When a plurality of margin reinforcing layers R2 are disposed in one margin portion M1/M2, it may mean that two or more margin reinforcing layers R2 distinguished from the margin portion M1/M2 are disposed in the margin portion M1/M2. There may be two or more margin reinforcing layers R2 included in one margin portion M1/M2, and for example, there may be 50 or less.

In the above exemplary embodiment, descriptions of the dielectric layer, the internal electrodes, the ceramic body, and the like are the same as described above, and thus will be omitted.

In another exemplary embodiment in the present disclosure, the multilayer ceramic electronic component of the present disclosure may include a first margin portion and a second margin portion respectively disposed on both surfaces of the capacitance portion in the second direction and include a first cover portion and a second cover portion respectively disposed on both surfaces of the capacitance portion in the third direction. The first cover portion and/or the second cover portion may include a cover reinforcing layer containing graphene, and the first margin portion and/or the second margin portion may include a margin reinforcing layer containing graphene.

In the above exemplary embodiment, the margin portion and the cover portion may include both a margin reinforcing layer and a cover reinforcing layer. In this case, the cover portion may be attached after the margin portion is first attached to the capacitance portion, but is not limited thereto, and the margin portion may be attached after the cover portion is first attached.

In the above exemplary embodiment, descriptions of the margin reinforcing layer and the cover reinforcing layer are the same as described above, and thus will be omitted.

The multilayer ceramic electronic component according to the present disclosure may include a first external electrode 131 connected to the first internal electrode 121 and a second external electrode 132 connected to the second internal electrode 122, respectively. The first external electrode 131 may be disposed on the first surface S1 of the capacitance portion A1. In addition, the second external electrode 132 may be disposed on the second surface S6 of the capacitance portion A1.

The first external electrode 131 and the second external electrode 132 may be formed of a conductive paste including a conductive metal and glass. The first and second external electrodes 131 and 132 may be sintered electrodes formed by firing the conductive paste. The conductive metal included in the first and second external electrodes 131 and 132 is not particularly limited and may be one or more of, for example, copper (Cu), nickel (Ni), tin (Sn), palladium (Pd), platinum (Pt), gold (Au), silver (Ag), tungsten (W), titanium (Ti), lead (Pb), and alloys thereof.

The glass may be, for example, one or more selected from the group consisting of silicon (Si), boron (B), aluminum (Al), transition metal, alkali metal, alkaline earth metal, oxide nitride, carbide, and carbonate thereof, but is not limited thereto. The transition metal may be selected from the group consisting of zinc (Zn), titanium (Ti), copper (Cu), vanadium (V), manganese (Mn), iron (Fe) and nickel (Ni), and the alkali metal may be one or more selected from the group consisting of lithium (Li), sodium (Na), and potassium (K), and the alkaline earth metal may be one or more selected from the group consisting of magnesium (Mg), calcium (Ca), strontium (Sr) and barium (Ba).

According to an exemplary embodiment in the present disclosure, the first and second external electrodes 131 and 132 of the present disclosure may be formed by transferring a conductive paste sheet. In the multilayer ceramic electronic component according to the present disclosure, since the first and second external electrodes 131 and 132 are formed by a transfer method, the first and second external electrodes may have a uniform thickness, and the first and second external electrodes may be evenly formed even at the corners of the ceramic body.

In another exemplary embodiment in the present disclosure, the first and second external electrodes 131 and 132 of the present disclosure may be formed by dipping the ceramic body in a conductive paste.

In an example of the present disclosure, a plating layer may be disposed on the first and second external electrodes of the multilayer ceramic electronic component according to the present disclosure. The plating layer may be formed as a single layer may include multiple layers. The plating layer may include at least one of silver (Ag), palladium (Pd), gold (Au), platinum (Pt), nickel (Ni), copper (Cu), tin (Sn), tungsten (W), palladium (Pd), titanium (Ti), and alloys thereof, but is not limited thereto. The plating layer may be formed by sputtering or electroplating, but is not limited thereto.

As set forth above, one of several effects according to the present disclosure may provide a multilayer ceramic electronic component having improved mechanical strength.

One of several effects according to the present disclosure may provide a multilayer ceramic electronic component capable of suppressing an occurrence of cracks.

One of the various effects of the present disclosure may provide a multilayer ceramic electronic component capable of suppressing the growth of formed cracks.

While example exemplary embodiments have been shown and described above, it will be apparent to those skilled in the art that modifications and variations could be made without departing from the scope of the present disclosure as defined by the appended claims.

What is claimed is:

1. A multilayer ceramic electronic component comprising:
    a ceramic body including a dielectric layer and first and second internal electrodes disposed to face each other with the dielectric layer interposed therebetween;
    a first external electrode connected to the first internal electrode; and
    a second external electrode connected to the second internal electrode,
    wherein the ceramic body includes
        first and second surfaces opposing each other in a first direction, third and fourth surfaces opposing each other in a second direction, and fifth and sixth surfaces opposing each other in a third direction and
    the ceramic body includes
        a capacitance portion including the first and second internal electrodes stacked in the third direction to form capacitance,
        a first cover portion disposed on the fifth surface, and
        a second cover portion disposed on the sixth surface,
    wherein the first cover portion and/or the second cover portion include a cover reinforcing layer including graphene, and
    an average thickness of the cover reinforcing layer is 5% or more and 50% or less of an average thickness of the first cover portion or the second cover portion.

2. The multilayer ceramic electronic component of claim 1, wherein
    the ceramic body includes:
    a first margin portion disposed on the third surface, and
    a second margin portion disposed on the fourth surface,
    wherein the first margin portion and/or the second margin portion include a margin reinforcing layer including graphene, and
    an average thickness of the margin reinforcing layer is 5% or more of an average thickness of the first margin portion or the second margin portion.

3. The multilayer ceramic electronic component of claim 2, wherein the average thickness of the margin reinforcing layer is 50% or less of the average thickness of the first margin portion or the second margin portion.

4. The multilayer ceramic electronic component of claim 1, wherein the first cover portion and the second cover portion include the cover reinforcing layer.

5. The multilayer ceramic electronic component of claim 1, wherein the cover reinforcing layer is disposed to be in contact with the capacitance portion.

6. The multilayer ceramic electronic component of claim 1, wherein the cover reinforcing layer provides at least a portion of one of the fifth and sixth surfaces of the ceramic body.

7. The multilayer ceramic electronic component of claim 1, wherein the cover reinforcing layer is spaced apart from the capacitance portion and a surface of the ceramic body.

8. The multilayer ceramic electronic component of claim 1, wherein the cover reinforcing layer is arranged in plurality.

9. The multilayer ceramic electronic component of claim 1, wherein the capacitance portion does not include graphene.

10. The multilayer ceramic electronic component of claim 1, wherein
    the capacitance portion and the first and second cover portions include a grain and a grain boundary, and
    an average particle diameter of the grain of at least one of the first and second cover portions is smaller than an average particle diameter of the grain of the capacitance portion.

11. The multilayer ceramic electronic component of claim 1, wherein
    the cover reinforcing layer includes a grain and a grain boundary, and
    the graphene is disposed in the grain boundary.

12. The multilayer ceramic electronic component of claim 1, wherein an average thickness of the dielectric layer is 0.01 µm or more and 0.4 µm or less.

13. The multilayer ceramic electronic component of claim 12, wherein an average thickness of the first internal electrode and the second internal electrode is 0.01 µm or more and 0.4 µm or less.

14. The multilayer ceramic electronic component of claim 1, wherein an average thickness of the first internal electrode and the second internal electrode is 0.01 µm or more and 0.4 µm or less.

15. A multilayer ceramic electronic component comprising:
    a ceramic body including a dielectric layer and first and second internal electrodes disposed to face each other with the dielectric layer interposed therebetween;
    a first external electrode connected to the first internal electrode; and
    a second external electrode connected to the second internal electrode,
    wherein the ceramic body includes
    first and second surfaces opposing each other in a first direction,
    third and fourth surfaces opposing each other in a second direction, and
    fifth and sixth surfaces opposing each other in a third direction, and
    the ceramic body includes:

a capacitance portion including the first and second internal electrodes stacked in the third direction to form capacitance, a first margin portion disposed on the third surface, and a second margin portion disposed on the fourth surface, wherein the first margin portion and/or the second margin portion include a margin reinforcing layer including graphene, and an average thickness of the margin reinforcing layer is 5% or more and 50% or less of an average thickness of the first margin portion or the second margin portion.

16. The multilayer ceramic electronic component of claim 15, wherein the first margin portion and the second margin portion include the margin reinforcing layer.

17. The multilayer ceramic electronic component of claim 15, wherein the margin reinforcing layer is disposed to be in contact with the capacitance portion.

18. The multilayer ceramic electronic component of claim 15, wherein the margin reinforcing layer provides at least a portion of one of the third and fourth surfaces of the ceramic body.

19. The multilayer ceramic electronic component of claim 15, wherein the margin reinforcing layer is spaced apart from the capacitance portion and a surface of the ceramic body.

20. The multilayer ceramic electronic component of claim 15, wherein the margin reinforcing layer is arranged in plurality.

21. The multilayer ceramic electronic component of claim 15, wherein the capacitance portion does not include graphene.

22. The multilayer ceramic electronic component of claim 15, wherein the capacitance portion and the first and second margin portions include a grain and a grain boundary, and an average particle diameter of the grain of at least one of the first and second margin portions is smaller than an average particle diameter of the grain of the capacitance portion.

23. The multilayer ceramic electronic component of claim 15, wherein the margin reinforcing layer include a grain and a grain boundary, and the graphene is disposed in the grain boundary.

24. The multilayer ceramic electronic component of claim 15, wherein an average thickness of the dielectric layer is 0.01 μm or more and 0.4 μm or less.

25. The multilayer ceramic electronic component of claim 24, wherein an average thickness of the first internal electrode and the second internal electrode is 0.01 μm or more and 0.4 μm or less.

26. The multilayer ceramic electronic component of claim 15, wherein an average thickness of the first internal electrode and the second internal electrode is 0.01 μm or more and 0.4 μm or less.

* * * * *